April 9, 1957 M. D. YOUNGREN 2,787,852

GREETING CARD

Filed Dec. 19, 1952 2 Sheets-Sheet 1

INVENTOR.

Milton D. Youngren.

BY Fishburn & Mullendore

ATTORNEYS.

April 9, 1957 M. D. YOUNGREN 2,787,852

GREETING CARD

Filed Dec. 19, 1952 2 Sheets-Sheet 2

INVENTOR.
Milton D. Youngren.
BY
Fishburn & Mullendore
ATTORNEYS.

United States Patent Office 2,787,852

Patented Apr. 9, 1957

2,787,852

GREETING CARD

Milton D. Youngren, Glencoe, Ill.

Application December 19, 1952, Serial No. 326,935

6 Claims. (Cl. 40—70)

This invention relates to greeting cards, and more particularly to a greeting card for forming composite verses or sayings by manipulation of the card.

Other objects of the present invention are to provide a card having a front and back portion made from a single sheet of paper or the like and folded upon itself and having wheels or disks rotatably mounted on the front and back sheet; to provide the sheet or face of the card with a plurality of openings; to provide the disk rotatably mounted on the front face with a plurality of openings and indicia carrying members in alternate relation and conforming to the openings in the face of the card; to provide the surfaces of the disk with indicia such as verses, sayings or other illustrations; to provide the disk rotatably mounted on the inside face of the back of the card with faces conforming to the opening in the disk on the rear side of the front face of the card; to provide the faces with indicia such as verses, sayings or other illustrations; to provide space on said rotatable disk for pictorial illustrations in addition to said verses; to provide cutaway portions in the edges of the front and back of said card so the operator may rotate the respective disks at will; to arrange said disks on the front and rear of the cards in slightly offset relation so that the edge of one disk will extend over the cutaway portion on one side of the card and the other disk extends over the cutaway portion on the other side of the card; and to provide means for securing the respective front and back of the card together.

In accomplishing these and other objects of the invention I have provided improved details of structure the preferred forms of which are shown in the accompanying drawings wherein.

Figure 1:
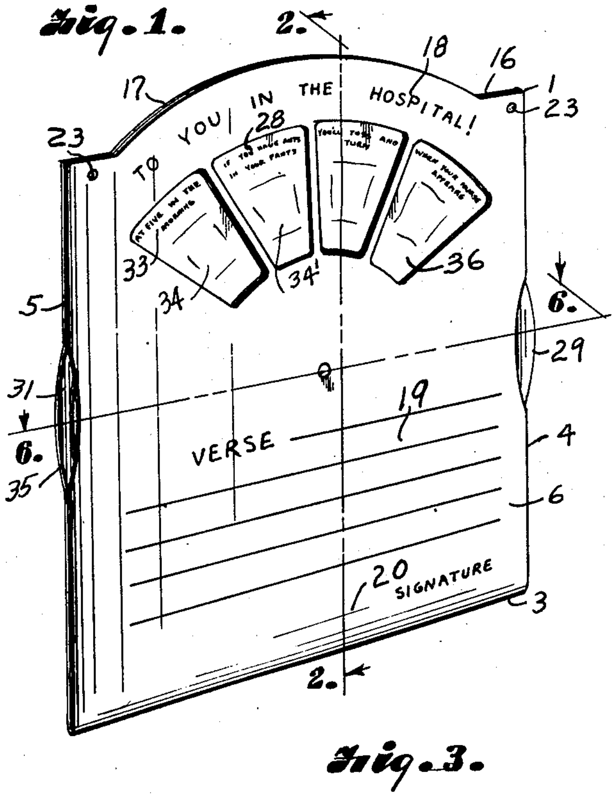
Fig. 1 is a perspective view of a card illustrating my invention.
Figure 2:
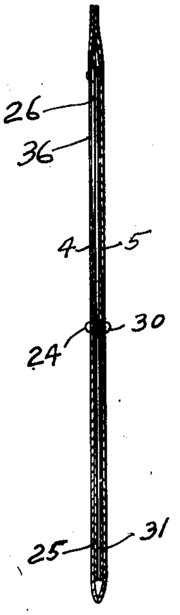
Fig. 2 is a cross-sectional view taken on a line 2—2, Fig. 1.
Figure 4:
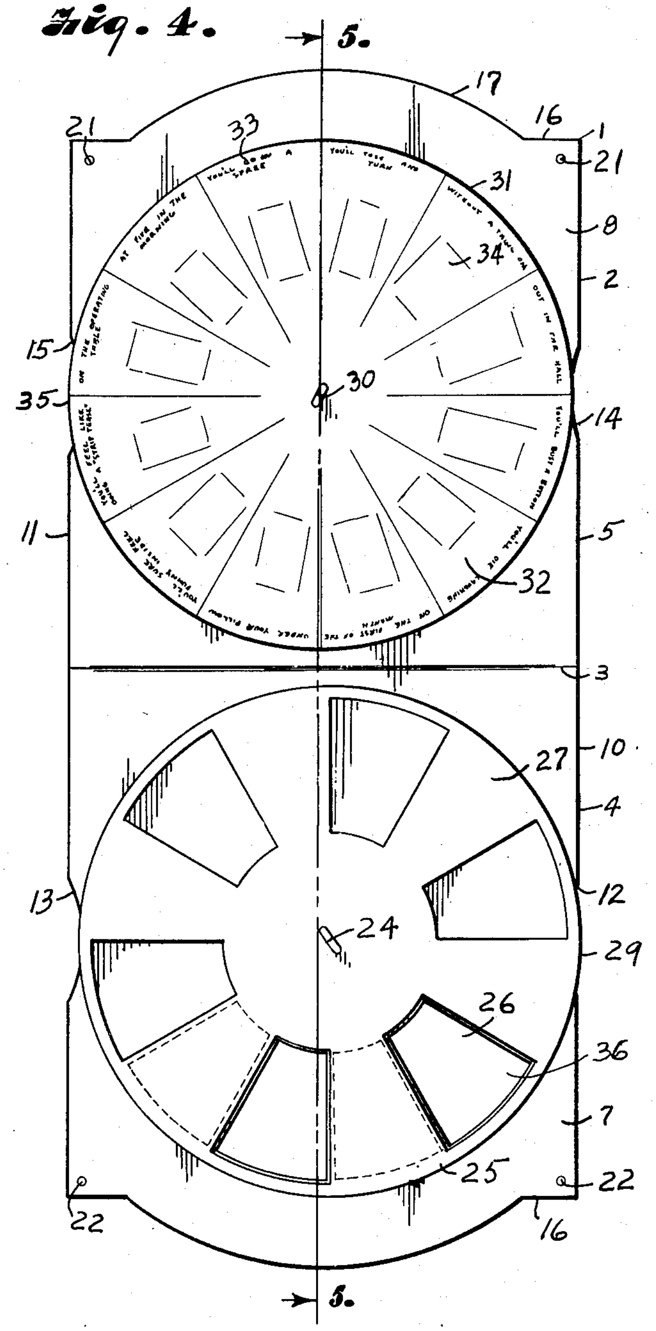
Fig. 4 is an elevational view of the card in open position.
Figure 5:
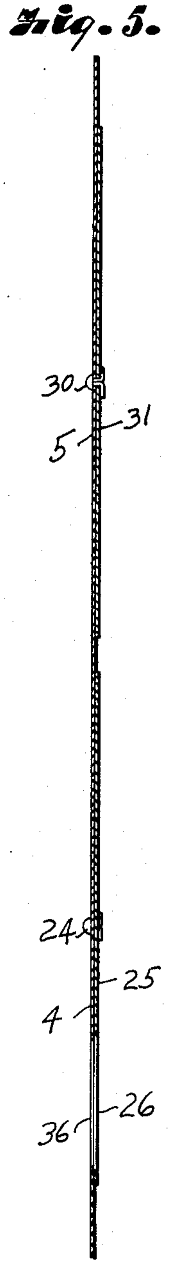
Fig. 5 is a cross-sectional view taken on a line 5—5, Fig. 4.

Referring more in detail to the drawings:

1 designates a card embodying the features of my invention comprising a sheet of paper, cardboard or the like 2 folded upon itself as indicated at 3 forming a front 4 and back 5. The front 4 has a front face 6 and rear face 7 and the back has a front face 8 and a rear face 9. The side edges 10 and 11 of the card are provided with face cutaway or recessed portions 12—13 and 14—15, respectively, so that when the card is folded the cutaway portions meet and are at the substantial center edge of the card as best illustrated in Fig. 1. The outer free edges 16 of the card are rounded as indicated at 17. The front face 2 of the card is provided with indicia designating the type of greetings as indicated at 18 and the lower part of the front face has a space for a verse and signature as indicated at 19 and 20, respectively. The respective corners of the card are provided with openings as indicated at 21 and 22 (Fig. 4). When the card is folded on the line 3 the respective front and back of the card are held together by rivets or the like 23 inserted through the openings 21 and 22.

Figure 3:
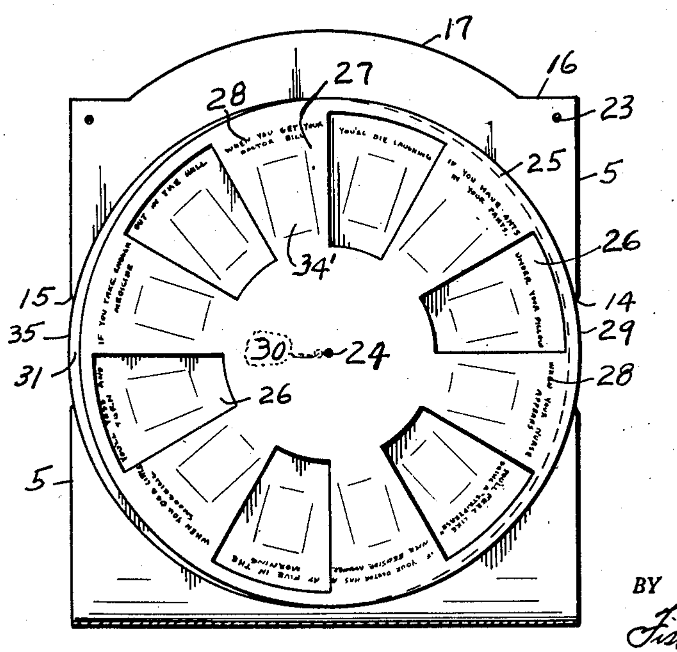
Fig. 3 is a sectional view illustrating the respective disks in elevation and in position as the card is closed.

Mounted on the back of the front 4 of the card by a rivet or the like 24 is a disk or wheel 25 having a plurality of spaced openings 26 around the outer perimeter thereof and having plane surfaces therebetween as indicated at 27. The openings 26 are of a shape similar to a part of a sector, or a part of two circles bounded by two radii and the arcs subtended by them. The plane surfaces 27 are provided with sentences, parts of verses or other indicia as indicated at 28 (Fig. 3). It will be noted the disk 25 is mounted slightly off center from the center of the front of the card so that the edge 29 thereof will extend over the recessed portion 12 so that the edge of the disk will be available for rotation of the disk by the finger of the operator.

Figure 6:
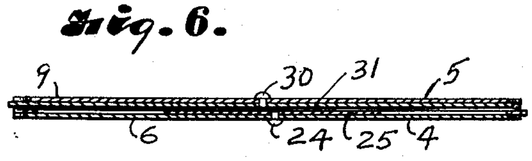
Fig. 6 is a cross-sectional view taken on a line 6—6, Fig. 1.

Mounted on the front of the rear portion 5 of the card by a rivet or the like 30 is a disk 31 having a plurality of indicia carrying spaces 32 provided with portions of sentences or indicia as indicated at 33. These indicia carrying spaces 32 are of substantially the same size of and conforming in shape to the openings 26 in the wheel 25 and the openings 36 in the front face of the card. The indicia carrying surfaces 27 and 32 are also provided with spaces 34 and 34' for pictorial illustrations or other matter if desired. The disk 31 is mounted at substantially the center of the card but slightly to the side opposite mounting of wheel 25 so that the edge 35 extends over the recessed portion 15 in order that the disk 31 may be rotated by the finger of the operator, the wheels 25 and 31 being mounted slightly offset to each other as best illustrated in Figs. 3 and 6, so that the wheels may be turned at the same time by contact therewith by the finger of the operator.

The front face 4 of the card is provided near the upper portion thereof with a plurality of window openings 36 of substantially the same shape of the opening 26 in the disk 25 and the indicia surfaces 32 on the disk 31 so that the indicia 32 can be viewed through the window openings 36 upon manipulation of the disks 25 and 31. I have here illustrated four window openings but any desired number may be used without departing from the spirit of my invention as well as any number of window openings 26 in the wheel 25 and indicia surfaces 32 on the disk 31.

It will also be understood that any form of material or illustrations may be used for the title of the card as indicated at 18 and also pictorial illustrations or other indicia may be used on the disks 25 and 31 to form different characters or parts thereof without departing from the spirit of this invention. For instance, a portion of an illustration may be depicted on one indicia surface and another portion of such illustration depicted upon another so that they may form a complete character upon matching of the indicia surface by rotation of the wheel.

In operating a card assembled and constructed as described, by using the tips of the fingers on the edges 29 of wheel 25 and the edge 35 of the wheel 31 the wheels may be rotated in either direction simultaneously or independently to bring the indicia 28 on the wheel 25 in view through one of the openings 36 in the face of the card and certain of the indicia 33 on the wheel 31 in line with other of the openings 36 and the openings 26 in disk 25 so that certain sentences or parts of sentences may be read through the openings at the will of the operator. At the same time any illustration on the spaces 34 may be viewed through the openings 36.

It will be obvious from the foregoing that I have provided an improved greeting card operable at the will of the operator for providing verses and other indicia to be viewed through the card and to provide amusement for the operator as desired.

What I claim and desire to secure by Letters Patent is:

1. In a variable display card, the combination comprising, front and back panels having interconnected edge portions, said front panel having a plurality of windows therein spaced along an arcuate path, front and back disks rotatably received between said front and back panels, said front disk having alternate window elements and front display area elements disposed therearound and movable into registration with said windows, said back disk having a plurality of angularly distributed back display area elements movable selectively into registration with said windows and exposed to view through said window elements, a first pivot rotatably mounting said front disk on said front panel, a second pivot rotatably mounting said back disk on said back panel, said first and second pivots being disposed generally in centered relation to said arcuate path but being offset slightly with respect to each other so that said disks are actually rotatable about slightly different centers, said disks having diametrically opposite portions projecting slightly beyond each other and projecting beyond opposite edge portions of said front and back panels for independent manipulation of said disks to change the combination of front and back display area elements exposed through said windows in said front panel.

2. In a variable display card, the combination comprising front and back panels having interconnected edge elements, said front panel having a plurality of windows therein spaced along an arcuate path, front and back disks rotatably mounted between said front and back panels, said disks being disposed generally in centered relation to said arcuate path, said front disk having alternate window elements and front display elements distributed angularly around its periphery and movable into registration with alternate windows in said front panel, said front display elements having sentence fragments thereon alternating between first and second types, said back disk having back display elements distributed therearound and movable into registration with said windows in said front panel for viewing through said window elements in said front disk, said back display elements having sentence fragments thereon of third and fourth types with pairs of said third type alternating with pairs of said fourth type, said first, second, third and fourth types of sentence fragments being complementary to define a complete sentence, said disks being independently rotatable to bring different combinations of each of said types of sentence fragments into view and thereby construct different complete sentences, a first pivot rotatably mounting said front disk on said front panel, and a second pivot rotatably mounting said back disk on said back panel, said first and second pivots being disposed generally in centered relation to said arcuate path but being offset slightly with respect to each other so that said disks are actually rotatable about slightly different centers, said disks having diametrically opposite portions projecting beyond each other and beyond opposite edge portions of said front and back panels for independent manipulation of said disks.

3. In a variable display card, the combination comprising front and back panels having interconnected edge elements, said front panel having a plurality of windows therein spaced along an arcuate path, front and back disks rotatably mounted between said front and back panels, said disks being disposed generally in centered relation to said arcuate path, said front disk having alternate window elements and front display elements distributed angularly around its periphery, and movable into registration with alternate windows in said front panel, said front display elements having sentence fragments thereon of different types arranged in a cyclically repeating sequence, said back disk having back display elements distributed therearound and movable into registration with said windows in said front panel for viewing through said window elements in said front disk, said back display elements having sentence fragments thereon of different types arranged in a cyclically repeating sequence, said types of sentence fragments on said front and back disks being complementary to define complete sentences, said disks being independently rotatable to bring different combinations of said types of sentence fragments into view and thereby construct different complete sentences, a first pivot pivotally mounting said front disk on said front panel, and a second pivot rotatably mounting said back disk on said back panel, said first and second pivots being disposed generally in centered relation to said arcuate path but being offset slightly with respect to each other so that said disks are actually rotatable about slightly different centers, said disks having diametrically opposite portions projecting beyond each other and beyond opposite edge portions of said front and back panels for independent manipulation of said disks.

4. In a variable display card, the combination comprising front and back panels having interconnected edge elements, said front panel having a plurality of windows therein spaced along an arcuate path, front and back disks rotatably mounted between said front and back panels, said disks being disposed generally in centered relation to said arcuate path, said front disk having alternate window elements and front display elements distributed angularly around its periphery and movable into registration with alternate windows in said front panel, said front display elements having sentence fragments thereon, said back disk having back display elements distributed therearound and movable into registration with said windows in said front panel for viewing through said window elements in said front disk, said back display elements having sentence fragments thereon, said sentence fragments on said front and back disks being of different but complementary types to define a complete sentence, said disks being independently rotatable to bring different combinations of said types of sentence fragments into view and thereby construct different complete sentences, a first pivot rotatably mounting said front disk on said front panel, and a second pivot rotatably mounting said back disk on said back panel, said first and second pivots being disposed generally in centered relation to said arcuate path but being offset slightly with respect to each other so that said disks are actually rotatable about slightly different centers, said disks having diametrically opposite portions projecting beyond each other and beyond opposite edge portions of said front and back panels for independent manipulation of said disks.

5. In a variable display card, the combination comprising front and back panels having interconnected edge portions, said front panel having a window therein, front and back disks rotatably received between said front and back panels, said front disk having a window element and a display panel element disposed thereon and selectively movable behind said window in said front panel, said back disk having a display panel element thereon movable selectively behind said window in said front panel, a first pivot rotatably mounting said front disk on said front panel, a second pivot rotatably mounting said back disk on said back panel, said first and second pivots being disposed generally in aligned relation to each other but being offset slightly with respect to each other so that said disks are actually rotatable about slightly different centers, said disks having diametrically opposite portions projecting slightly beyond each other and projecting beyond opposite edge portions of said front and back panels for independent manipulation of said disks.

6. In a variable display card, the combination comprising front and back panels having interconnected edge portions, said front panel having window means therein, front and back disks rotatably received between said front and back panels, said front disk having window means and display area means thereon movable behind said window means in said front panel, said back disk having display area means thereon movable behind said window means in said front panel and said front disk, a first pivot rotatably mounting said front disk on said front panel, a second pivot rotatably mounting said back disk on said back panel, said first and second pivots being disposed generally in aligned relation to each other but being offset slightly with respect to each other so that said disks are actually rotatable about slightly different centers, said disks having diametrically opposite portions projecting slightly beyond each other and projecting beyond opposite edge portions of said front and back panels for independent manipulation of said disks.

References Cited in the file of this patent

UNITED STATES PATENTS

| | | |
|---|---|---|
| 258,897 | Cussons | June 6, 1882 |
| 283,408 | Macdonell | Aug. 21, 1883 |
| 491,900 | Macdonell | Feb. 14, 1893 |
| 916,564 | Kristofek | Mar. 30, 1909 |
| 966,107 | Lowe | Aug. 2, 1910 |
| 1,029,588 | Campbell | June 18, 1912 |
| 1,494,266 | Mattice | May 13, 1924 |
| 1,634,713 | Gaines | July 5, 1927 |